Nov. 9, 1954
E. R. PIERCE
2,693,686
NUT BOWL WITH FOLLOWER
Filed May 15, 1953
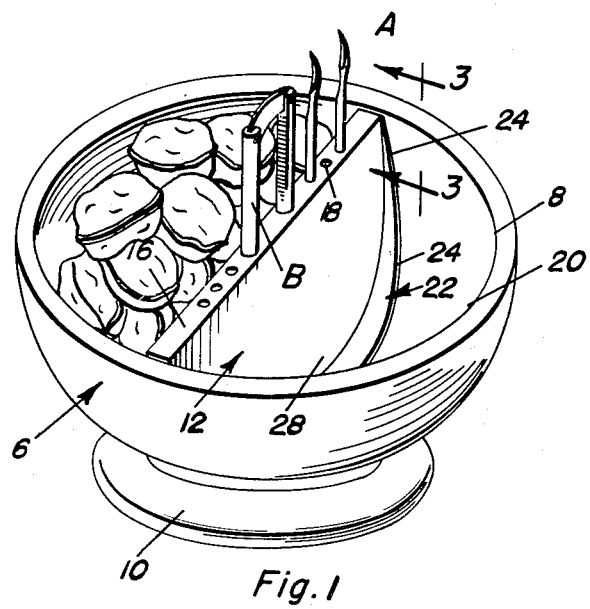
Fig. 1
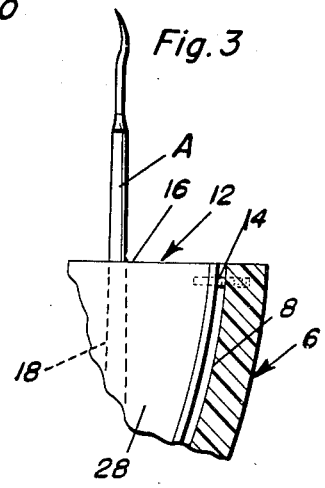
Fig. 3
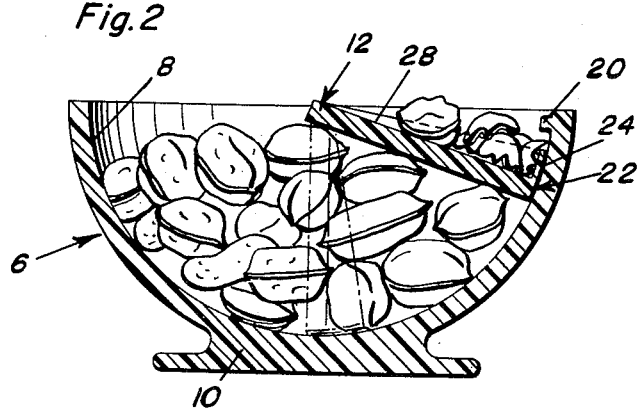
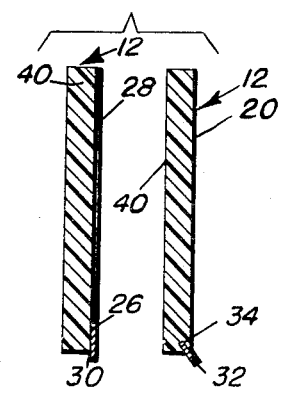
Fig. 4
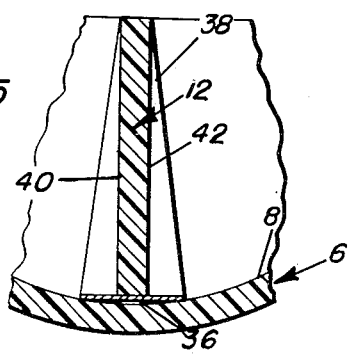
Fig. 5
Earl R. Pierce
INVENTOR.
BY *Clarence A. O'Brien*
*and Harvey B. Jacobson*
Attorneys

United States Patent Office 2,693,686
Patented Nov. 9, 1954

2,693,686

NUT BOWL WITH FOLLOWER

Earl R. Pierce, Ephrata, Wash.

Application May 15, 1953, Serial No. 355,340

1 Claim. (Cl. 65—15)

The present invention relates to a special purpose bowl or dish, which is herein conveniently identified as a nut bowl and which is distinguished from a conventional or ordinary bowl in that it is provided with extra or added facilities, functioning to appreciably increase the over-all utility of said bowl.

Stated somewhat more particularly, the invention has to do with what may be classified as a common bowl which is of, let us say, semi-spherical form and usable as a receptacle or container for walnuts, filberts, pecans and the like, the same being transformed into a bowl of improved utility in that it is provided with a partition functioning to divide the receptacle space into two distinguishable compartments or chambers, one for the ready-to-crack nuts and the other for the shells and refuse.

In carrying out a preferred embodiment of the invention a partition is centrally arranged and hingedly mounted between diametrically opposite side portions of the wall of the bowl, and is normally suspended in a vertical position by gravity, dividing the bowl into segmental compartments. The bowl may therefore be completely filled with whole nuts, and the partition may be swung or pushed into a horizontal position covering one-half portion of the open top of the bowl and thus serving as a follower and gradually receding shell accommodating tray for reception of the broken shells and small fibres and particles, and permitting the user to press the tray gradually downward in a step-by-step manner, making more room for shells and forcing the whole nuts upward on the reverse or underside of the tray for accessibility.

Then, too, novelty is predicated on the use of a substantially flat faced hingedly mounted semi-circular partition in a semi-spherical or concavo-convex bowl wherein the partition, when the bowl is empty, is in a suspended vertical central position, the upper edge having vertical bores and said bores providing sockets, and said sockets being adapted to receive nut meat picks or handle portions of a nut-cracking tool or implement.

Other objects, features and advantages will become more readily apparent from the following description and the accompanying sheet of drawings.

In the accompanying sheet of drawings wherein like numerals are employed to designate like parts throughout the views:

Figure 1 is a perspective view of a bowl constructed in accordance with the principles of the present invention and showing the manner in which same appears when it is half filled with whole nuts and before the nuts have been cracked, and with certain of the tools or implements racked in their respective sockets.

Figure 2 is a view in section and elevation based on Figure 1 with the bowl substantially full of uncracked or whole nuts and with a few broken shells placed in the "tray" provided by the stated partition.

Figure 3 is a fragmentary sectional and elevational view taken on the plane of the line 3—3 of Figure 1, looking in the direction of the arrows.

Figure 4 is a group view with parts in section showing modified or alternate forms of partitions, and Figure 5 is a fragmentary sectional view showing a portion of the bowl, and associated cooperating partition and marginal edge fabric or equivalent means defining "trays" on both flat sides of the partition.

Referring now to the drawings by reference numerals, the plastic or equivalent bowl is denoted by the numeral 6, and as before stated, this is a common or ordinary semi-spherical or equivalent bowl. The interior wall of the receptacle portion is conveniently denoted by the numeral 8 and the stand or base by the numeral 10. The preferred embodiment of the invention is that wherein the aforementioned partition is as shown. That is to say, the partition, which may be of any appropriate lightweight material, preferably commercial plastics, is denoted by the numeral 12 and is semi-circular in form and such that it conformingly fits in the receptacle portion of the bowl and occupies, at least when the bowl is empty, a suspended central vertical position dividing the bowl into duplicate segmental compartments or chambers. The upper respective ends are hingedly suspended between diametrically opposite portions of the walls of the bowl as shown at 14 in Figure 3. The upper flat edge 16 is substantially flush with the brim of the bowl when the partition is centrally suspended, and said edge is provided with suitable vertical bores 18 providing sockets for receiving and holding tools or implements, such as, for example, the nut meat pickers A, and the nut cracker or equivalent tool B. The numeral 20 on the wall of the bowl, as best shown in Figure 2 denotes a stop lug and limits the upward swing of the hinged partition in one direction. The purpose of this stop is to prevent the "tray" from swinging beyond the brim of the bowl while the shells are being emptied or dumped, and while there are nuts in the bowl in the opposite side of the tray, thus preventing the nuts from being dumped along with the broken shells.

In order to transform the swinging or hinged partition into a part which performs also as the aforementioned tray, the free curvate or marginal edge thereof is provided with lateral lip or flange means. It is desirable to mold or cast the partition with an integral flange 22 similar to that shown, and to thus provide a sort of a marginal visor, as appears in Figures 1 and 2. An edge portion of the flange is projected laterally, as at 24 and may cooperate in defining a shell collecting and disposal tray. It will be seen that the curved edge of the partition swings in close proximity to the wall surfaces of the receptacle portion of the bowl, and also the flange 22 may be even closer to have actual wiping or scraping contact. It follows that the partition is not only a collecting and disposing tray, it is also a follower, in that it assists in pressing the whole nuts down into the bowl and then up in a direction from right to left, in Figure 2, for example, whereby the whole nuts are accessible for ready handling and cracking by the user.

As shown, the material is preferably commercial plastics and the mode of manufacture will probably be casting or die operation. My reason for preferring this manner of construction is based on my experiments with three different bowls which I made and used for months. My experiments clearly show that, even though small fragments of shells will get wedged between the separator and the inner surface of the bowl, they do not seriously hamper the swinging of the separator because its normal operation is away from the shell fragments and toward the whole nuts. Then, too, when the bowl and separator are both made of plastic, this construction can be accomplished with two sets of dies and no manual operations except to slightly spring the bowl into a slightly ovate form and insert the separator lugs (for "hingedly attaching said separator to said bowl") into holes in the bowl, or vice versa. Thus, a minimum of manual operation means lower cost.

There are alternative forms of lips used, and reference is made, for example, to Figure 4 wherein a simple semi-circular strip of fabric 26 is glued or otherwise fastened to one flat face, for example, the face 28, and projects beyond the marginal edge as at 30. In the modification seen to the right thereof in Figure 4, a simple flap 32 is provided and one edge portion is embedded or fastened in a groove, provided therefor as at 34. In the form of the invention shown in Figure 5, a piece of fabric is employed which is wide at the center and has its central portion 36 fastened to the edge of the partition, and has its opposite end portions narrowed as at 38, with the curvate marginal edge portions projecting respectively beyond the faces 40 and 42, as appears in the modification seen in Figure 5. Here a duplex or double tray-type partition is had, as is obvious.

As before stated, it is a purpose of the construction stated to provide soft pliable material which will be constantly in contact with the inner surfaces of the bowl, thus effecting a cleaning action. The strip or strips of pliable material serve to pick up fine fragments of shells and push them ahead of it, as the separator or partition is moved forward or backward, thus preventing small, hard particles of the shells from wedging between the separator and the inner surfaces of the bowl.

Since the invention is of the utmost in simplicity of construction and purposeful functioning, it is thought that it is unnecessary to include a more specific description at this stage.

What is claimed as new is as follows:

A bowl for nuts and cracked shells comprising an open top, semi-spherical bowl, a flat-faced semi-circular partition disposed within the receptacle portion of the bowl and having the upper portions of its respective ends hinged at diametrically opposite places to the wall of said bowl and permitting the partition to swing back and forth in said receptacle portion, and means marginally attached to said partition and disposed laterally thereto and having wiping contact with the interior surfaces of said receptacle portion as the partition slowly sweeps in its travel motion in the bowl, said means cooperating with said partition and functioning to transform the partition into a shell collecting tray.

References Cited in the file of this patent

UNITED STATES PATENTS

| Number | Name | Date |
|---|---|---|
| D. 43,656 | Van de Berg | Feb. 25, 1913 |
| 60,308 | Whittaker | Dec. 4, 1866 |
| 273,853 | Kautz | Mar. 13, 1883 |
| 733,002 | Burgess | July 7, 1903 |
| 948,434 | Scott | Feb. 8, 1910 |
| 960,833 | Crum | June 7, 1910 |
| 1,138,288 | Harper | May 4, 1915 |
| 1,185,026 | Urner | May 30, 1916 |
| 1,500,007 | Sibbald | July 1, 1924 |
| 2,240,842 | Gehring et al. | May 6, 1941 |
| 2,453,274 | Serowy | Nov. 9, 1948 |
| 2,630,014 | Chester | Mar. 3, 1953 |

FOREIGN PATENTS

| Number | Country | Date |
|---|---|---|
| 17,128 | Great Britain | July 19, 1910 |